(12) United States Patent  
Peirce et al.

(10) Patent No.: US 9,098,505 B2  
(45) Date of Patent: Aug. 4, 2015

(54) FRAMEWORK FOR MEDIA PRESENTATION PLAYBACK

(71) Applicant: Apple Inc., Cupertino, CA (US)

(72) Inventors: Michael Richard Peirce, Lewis Center, OH (US); Eric Tilton, Austin, TX (US); David Mack, Halifax (CA); Mark Flider, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/309,792

(22) Filed: Jun. 19, 2014

(65) Prior Publication Data

US 2014/0304307 A1    Oct. 9, 2014

Related U.S. Application Data

(63) Continuation of application No. 12/856,317, filed on Aug. 13, 2010, now Pat. No. 8,775,472.

(60) Provisional application No. 61/234,162, filed on Aug. 14, 2009.

(51) Int. Cl.  
*G06F 17/30* (2006.01)

(52) U.S. Cl.  
CPC .......... *G06F 17/30017* (2013.01); *G06F 17/30* (2013.01); *G06F 17/30056* (2013.01)

(58) Field of Classification Search  
CPC ....................................................... G06F 17/30

USPC ................................................. 707/600–899  
See application file for complete search history.

(56) References Cited

U.S. PATENT DOCUMENTS

| | | | |
|---|---|---|---|
| 2006/0136812 | A1 | 6/2006 | Jones |
| 2008/0005652 | A1* | 1/2008 | Krishnaswamy et al. . 715/500.1 |
| 2008/0195981 | A1 | 8/2008 | Pulier |
| 2009/0217352 | A1 | 8/2009 | Shen |
| 2010/0239222 | A1 | 9/2010 | Bhogal |
| 2010/0293470 | A1* | 11/2010 | Zhao et al. .................... 715/732 |

* cited by examiner

*Primary Examiner* — Isaac M Woo  
(74) *Attorney, Agent, or Firm* — Blank Rome LLP

(57) ABSTRACT

A system for generating a structured file that includes all of the various media items need to play the corresponding media presentation is described. (Media items include, for example, images, movies, and audio files.) In one implementation, all of the various media items needed to support the presentation's playback may be collected, where after at least one of them is texturized. Texturing means converting a media item from a larger format to a smaller format. For example, a JPEG file (described in terms of scalable vector-based data) may be texturized to a PNG file (described in terms of pixel data). The items may then be organized in accordance with an event, and stored in a structured file. Once organized by event (e.g., presentation pause-points, frame transitions, effect transitions, input "click" and the like), the media items may be stored into the structured file, ready to playback the media presentation.

23 Claims, 9 Drawing Sheets

FRAMEWORK FOR MEDIA PRESENTATION PLAYBACK

This application claims the benefit and priority of U.S. provisional patent application No. 61/234,162, which was filed on Aug. 14, 2009, and is incorporated herein by reference in its entirety. The subject matter described generally herein relates to the field of media and, in particular, to the field of media presentations.

BACKGROUND

Current media applications may offer features for creating slideshows by editing individual slides in a customized manner and by facilitating the importation of media such as clip art, images, video, and audio. Such applications may also offer features for organizing slides, associating simple themes and effects to slides, adding backgrounds to each slide or a group of slides, and associating timing. Upon completion of the editing and creation of a new slideshow or other media presentation, the editor application may save the clip art, images, video, audio, slides, themes and effects, backgrounds, and timing all in one file that is executable by the editor application or that may be converted into another file-type that is executable by an application such as a web browser. The file may be overly large due to the size of the media and, as a result, may be processor and memory intensive. Further, the file may contain abstract or generic instructions that may require additional processing, interpretation, and overhead. In addition, the file may be executed inefficiently because it is not capable of being customized or interpreted for execution efficiently on various devices.

Current media applications, moreover, do not provide a media presentation application with the capability of exporting data/content of a media presentation to a structured file that may be organized according to events. Further, current media applications also do not create tags for mapping between the identity of media and the use of media, do not include a header with metadata, where the metadata may identify, for example, the media presentation, the media presentation source, the structured file destination, the playback device identity, the operating system identity, the browser identity, or supported media types. In addition, current media applications also do not optimize the playback of the media presentation to a particular playback device and its characteristics through, for example, a reader application accessing the structured file.

SUMMARY

Accordingly, an embodiment of the invention is directed to a system and method for exporting a media presentation from a presentation application. Another embodiment of the invention is directed to a system and method for reading a structured file containing data related to a media presentation. Each of these embodiments substantially obviates one or more problems due to limitations and disadvantages of the related art.

In an embodiment, the present invention provides a computer-implemented method for exporting a media presentation from a presentation application by creating a structured file for storing data related to the media presentation, accessing the data related to the media presentation from the presentation application, organizing the data related to the media presentation according to an event, and exporting the organized data related to the media presentation to the structured file.

In another embodiment, the present invention provides a computer-implemented method for reading a structured file containing data related to a media presentation by accessing the structured file containing content related to a media presentation, reading the accessed file using an interpreter of a playback device, wherein the interpreter parses the content of the structured file, and executing the content of the accessed file according to a characteristic associated with the playback device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system includes one or more processors, memory, a display device, and one or more programs stored in memory, where the one or more programs have instructions to create a structured file for storing data related to the media presentation, access the data related to the media presentation from the presentation application, organize the data related to the media presentation according to an event, and export the organized data related to the media presentation to the structured file.

In another embodiment, a computer-readable storage medium stores one or more programs configured for execution by a computer, the one or more programs having instructions to create a structured file for storing data related to the media presentation, access the data related to the media presentation from the presentation application, organize the data related to the media presentation according to an event, and export the organized data related to the media presentation to the structured file.

In yet another embodiment, a system includes one or more processors, memory, a display device, and one or more programs stored in memory, where the one or more programs have instructions to access the structured file containing content related to a media presentation, read the accessed file using an interpreter of a playback device, wherein the interpreter parses the content of the structured file, and execute the content of the accessed file according to a characteristic associated with the playback device.

In yet another embodiment, a computer-readable storage medium stores one or more programs configured for execution by a computer, the one or more programs having instructions to access the structured file containing content related to a media presentation, read the accessed file using an interpreter of a playback device, wherein the interpreter parses the content of the structured file, and executes the content of the accessed file according to a characteristic associated with the playback device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of standalone system or client-server compatible system containing any type of client, network, server, and database elements.

Figure 1:
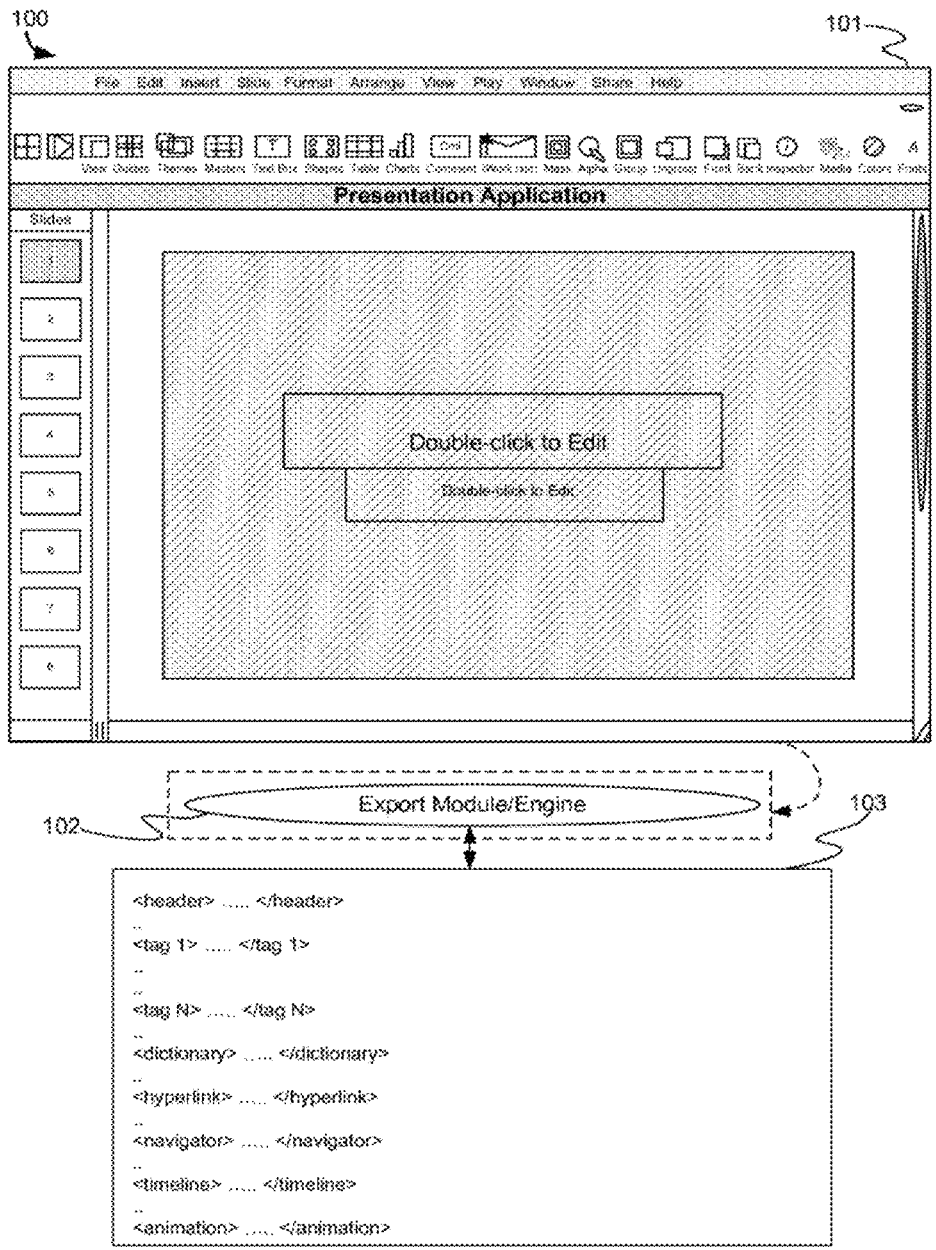
FIG. 1 illustrates an exemplary embodiment of a media presentation application exporting a structured file in accordance with the present invention.

FIG. 1 illustrates an exemplary embodiment 100 of a media presentation application 101 exporting 102 a structured file 103 in accordance with the present invention. In the exemplary embodiment 100, a user may activate the presentation application 101 to create, edit, view, play, and share a media presentation such as, for example, a slideshow of text, pictures, audio, and/or video, each separately or in combinations. These may also be referred to as data related to the media presentation. The export module/engine 102 may be invoked at some point after the user indicates, via the presentation application, that a media presentation is ready for exportation. After the user invokes the appropriate export feature, which may be done through a share 211 feature/option pull-down menu (shown in FIG. 2) on the media presentation application 101, the media presentation application 101 calls the export module/engine 102. The export module/engine 102 then performs one or more operations on the data related to the media presentation and sends the output of the operations to a structured file 103.

Figure 2:
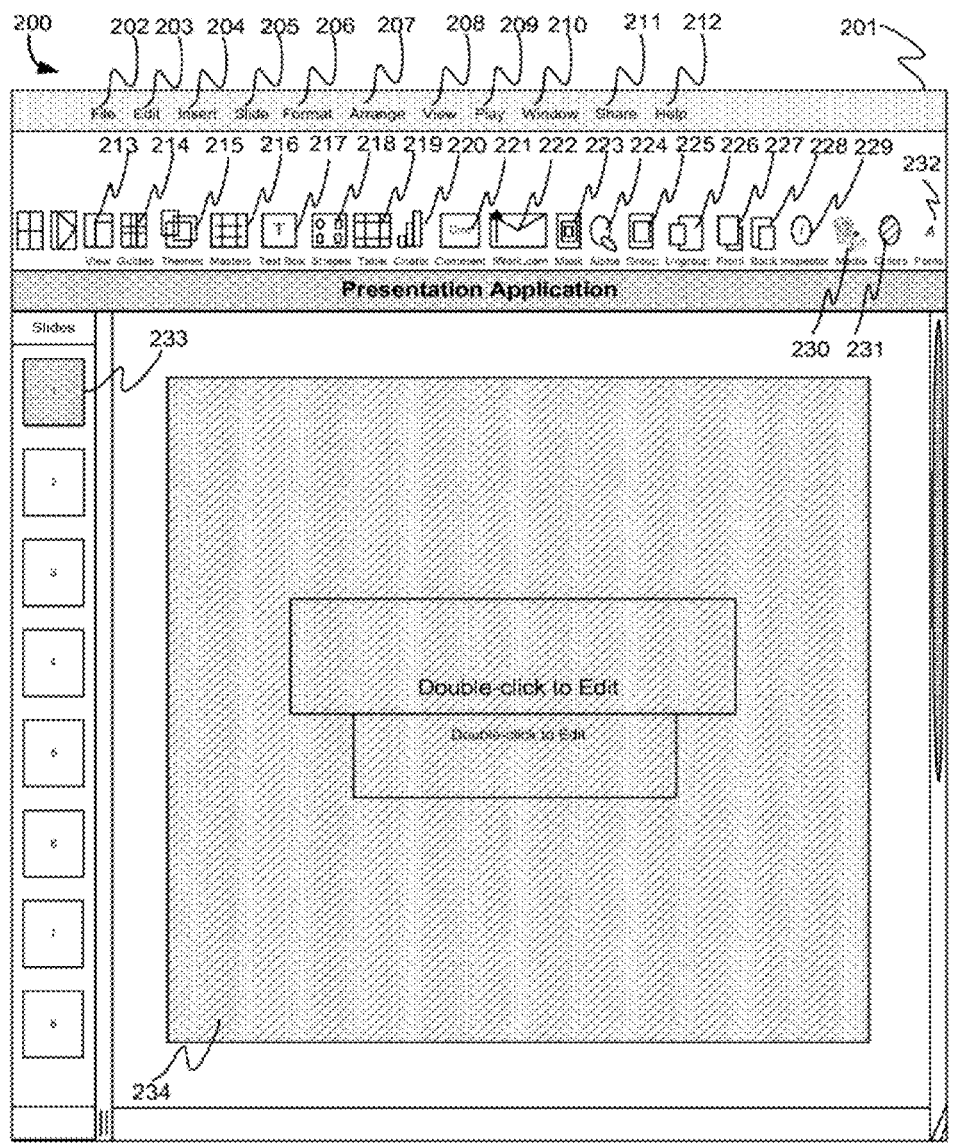
FIG. 2 illustrates an exemplary embodiment of a media presentation application in accordance with the present invention.

FIG. 2 illustrates an exemplary embodiment 200 of a media presentation application 201 in accordance with the present invention. The media presentation application 201 may include several menu features such as, for example, file 202, edit 203, insert 204, slide 205, format 206, arrange 207, view 208, play 209, window 210, share 211, and help 212. Each of these menu features 202-212 may further include additional features or options for creating, edit, and/or manipulating a media presentation through the media presentation application 201. Each of the menu features 202-212, as well as any additional features or options, may have one or more corresponding modules/engines for implementing the execution of the invoked menu feature or option by sending instructions to one or more computer processors for execution.

The file 202 menu feature may include, for example, a feature or option (not shown) for creating a new media presentation (with or without a theme), opening a media presentation, closing a media presentation, saving a media presentation, reverting to a saved media presentation, exporting a media presentation, reducing the file size of a media presentation (e.g., in kilobytes, megabytes, etc.), recording a slideshow, clearing a recording, choosing a theme, saving a theme, and/or printing.

The insert 204 menu feature may include, for example, a feature or option (not shown) for inserting a column break, text box, shape, table, function, chart, smart build (e.g., dissolve, flip, grid, push, revolve, shuffle, spin, spinning cube, swap, thumb through, and/or turntable), connection line, comment, and/or text hyperlink.

The slide 205 menu feature may include, for example, a feature or option (not shown) for inserting a new slide, skipping a slide, expanding/collapsing a slide tree, showing/hiding a slide number, and/or a go-to slide (e.g., next, previous, first, and/or last).

The format 206 menu feature may include, for example, a feature or option (not shown) for formatting: the font, text, a table, a chart, a shape, and/or an image. The format 206 menu feature may further include, for example, a feature or option (not shown) for copying/pasting a style/animation, masking/masking with a shape, reapplying a master format to a selection, and/or other advanced features or options.

The arrange 207 menu feature may include, for example, a feature or option (not shown) for arranging a selection by it bringing forward/front or sending it backward/back, aligning objects (e.g., left, center, right, top, middle, or bottom), distributing objects (e.g., horizontally or vertically), flipping a selection horizontally/vertically, locking/unlocking the movement of a selection, and/or grouping/ungrouping the arrangement of a selection (e.g., where grouping corresponds to permitting overlap among the objects of the selection, and ungrouping corresponds to not permitting such overlap).

The view 208 menu feature may include, for example, a feature or option (not shown) for changing the views of the media presentation being created and edited. Such views may be, for example, a navigator view where a frame window 233 shows miniature-sized versions of each slide in sequential order, an outline view where an icon of a slide is presented next to its corresponding slide number, a slide only view where only the active slide 234 is shown in the media presentation application 201, or a light table view where each slide is presented in the media presentation application 201 as if it were an individual slide laying on the top of a table for organizing the slides. The view 208 menu feature may further include, for example, a feature or option (not shown) for showing/hiding a ruler guide, showing a presenter's notes, showing the master slide upon which the remainder of the slides are modeled, hiding comments, hiding a format bar, zooming to specific percentages or based on window or actual size, showing color options, showing image adjustment options, showing a media browser (e.g., of clip art, pictures, audio, and/or video), showing document warnings that may be generated automatically through analysis of the media presentation document by a module/engine, showing a toolbar, and/or customizing the appearance/features/options of a toolbar.

The play 209 menu feature may include, for example, a feature or option (not shown) for playing the media presentation (e.g., slideshow), recording a media presentation based on actions executed by the user of the media presentation application 201, clearing the recording of a media presentation, rehearsing a slideshow to enhance the timing of events (e.g., pause point, click, transition, gap, start of media, end of media, or note), and/or customizing the layout of the display during the play/execution of the media presentation (e.g., adjusting positioning of a current slide/previous slide/next slide, inserting/removing a clock/timer for illustrating time remaining/elapsed time, inserting/removing a ready-to-advance indicator, and inserting/removing notes).

The window 210 menu feature may include, for example, a feature or option (not shown) for minimizing/maximizing the media presentation application 201, zooming in/out on the active slide 234, and/or bringing all of the selected objects to the front or sending individual selected objects to the back relative to the position of other objects.

The share 211 menu feature may include, for example, a feature or option (not shown) for sharing the media presentation on a remote server hosting a website, where communications may be performed over a network 10 (e.g., Wide Area Network (WAN), Metropolitan Area Network (MAN), or Local Area Network (LAN)) over a wired (e.g., TCP/IP over Ethernet, IEEE 802.3) or wireless (e.g., WiFi (802.11), GSM, GPRS, W-CDMA, EDGE, or the like) link and the data may be stored in a remote server 311 (e.g., iWork.com) database 305, which may allow access by other users who may be designated to have access. One or more optimizations to the media presentation may be made upon invocation of the feature or option for sharing on the remote server 311 database 305 (shown in FIG. 3). Such optimizations may be made by the export module/engine 102 and may include, for example, optimizations made based on characteristics associated with a playback device (e.g., a handheld mobile device with wireless or other communications capability such as, for example, an iPhone®). (IPHONE is a registered trademark of Apple Inc.) Other optimizations may include, for example, converting larger media files into smaller media files (e.g., JPEG to PNG, MOV to H.264), or pre-formatting media for an operating system, memory capacity, display device type, graphics capability, playback application type, communications rate, communications protocol, content control setting, autoplay setting, audio capability, volume setting, or user input capability of a playback device. The share 211 menu feature may also include, for example, a feature or option (not shown) for showing a listing of media presentations or other documents designated as shared on the remote server 311 database 305, sending the media presentation via email as one or more different file types (e.g., Keynote®, PDF), sending the media presentation to one or more other applications (e.g., iDVD®, iPhoto®, iTunes®, iWeb, GarageBand®) or an external website (e.g., YouTube®), and/or exporting the media presentation to a file or device (e.g., QuickTime® movie, PDF, series of images, HTML code/webpages, iPod® or other playback device). (KEYNOTE, iPHOTO, iTUNES, GARAGEBAND, QUICKTIME and iPOD are registered trademarks of Apple Inc. YOUTUBE is a registered trademark of Google Inc.) The features or options for sending or exporting the media presentation may be implemented by the export module/engine 102.

The help 212 menu feature may include, for example, a feature or option (not shown) for providing searchable help information to general or specific inquiries regarding the use of the media presentation application 201.

The media presentation application 201 may also include several icon shortcuts 213-232 to menu features or options (e.g., 202-212) such as, for example, view 213, guides 214, themes 215, master slide 216, insert text box 217, insert shapes 218, insert table 219, insert chart 220, insert comment 221, upload/access remote server database 222 (e.g., iWork-.com®), mask 223, alpha 224, group objects 225, ungroup objects 226, send objects to front 227, send objects to back 228, inspect presentation 229, access media 230, view/change colors 231, and/or view/change fonts 232. (iWORK-.COM is a registered trademark of Apple Inc.) Each of these menu features 213-232 may have one or more corresponding modules/engines for implementing the execution of the invoked menu feature or option corresponding to the icon shortcut by sending instructions to one or more computer processors for execution.

Figure 3:
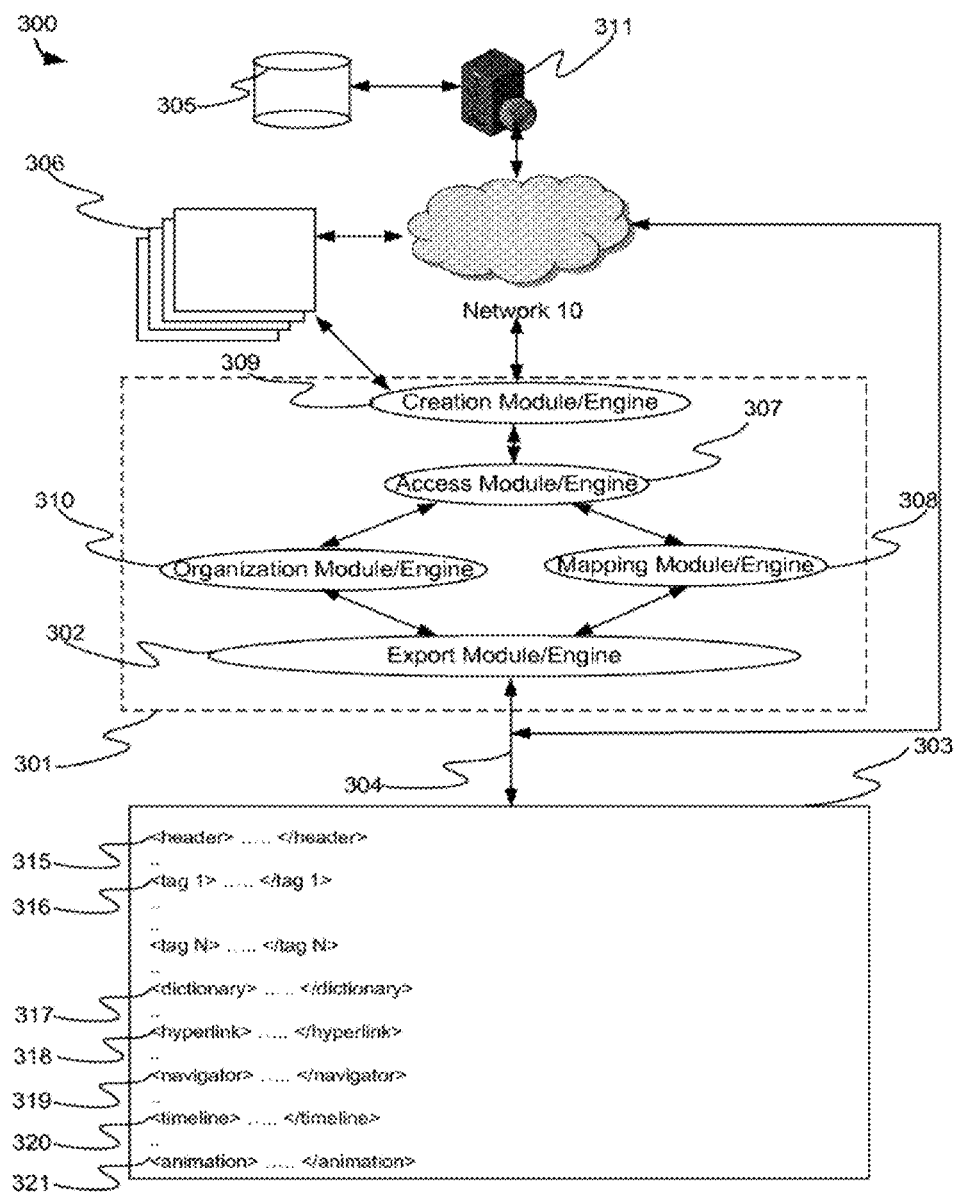
FIG. 3 illustrates an exemplary system block diagram of a media presentation application exporting a structured file in accordance with the present invention.

FIG. 3 illustrates an exemplary system block diagram 300 of a media presentation application 301 exporting a structured file 303 in accordance with the present invention. Several exemplary modules/engines may be invoked prior to and during the process of exporting a structured file 303 to local storage 606 (shown in FIG. 6) or to a remote server 311 database 305. These modules/engines may, for example, access 307 the data related to the media presentation from one or more media presentation files 306 that are created 309 and store data related to the media presentation. In addition, there may be a module/engine for organizing 310 the data accessed 307 according to one or more events. The events may include, for example, pause points during the presentation of slides or media content within a slide, a click of a mouse/touchpad or other input from the user of the media presentation application 201, a transition or other effect between a slide and another slide, a gap or other effect between a slide and another slide, the start of media (e.g., the beginning of audio, animation, a movie, or a combination thereof), the end of media, and/or the insertion or deletion of a note. An export module/engine 302 may then export 304 the organized data related to the media presentation to a structured file 303 (e.g., presentation.kpf) with a unique file format and with embedded clip art, pictures, audio, video, or a combination thereof The structured file may be saved in local storage 606 or on a remote server 311 database 305. The content of the structured file 303 may be represented as extensible markup language (XML) or as some other markup, scripting, text, code, or other language. An exemplary advantage of the structured file 303 is that it may contain texturized representations of the embedded clip art, pictures, audio, video, or combination thereof, and not the actual embedded media itself In some embodiments, a JPEG picture may be texturized and represented by the export module/engine as a PNG file with pixel data rather than, for example, scalable vector-based data. In some embodiments, a MOV movie may be texturized and represented by the export module/engine as a H264 file.

The structured file 303 may have a unique file structure that may include a header 315 and tags 316. The header 315 may include metadata representing information about the media presentation identity (e.g., name/title), the media presentation source (e.g., directory, URL, media presentation application version), the structured file destination (e.g., local directory, URL, remoter server name, database identifier), a playback device identity (e.g., iPhone, MacBook Pro®), an operating system identity (e.g., Mac OS-X®), a browser identity (e.g., Safari®), and/or supported media types (e.g., images, audio, video). (MACBOOK PRO, OS-X and SAFARI are registered trademarks of Apple Inc.) In some embodiments, the tags 316 may be for a media source list, a scenes/slide list, a hyperlink list 318, a navigator of scenes 319, an event timeline 320, and/or an event animation 321. Further, in some embodiments, the mapping module/engine 308 may map the identity of media in the media source list to a use for the media and the export module 302 may include tags 316 (e.g., tag N or dictionary 317) representing such a mapped schema in the structured file 303.

The use of the structured file 303 may provide one or more advantages such as, for example, less intensive processing and lowered demand for memory at runtime because the structure of the file 303, 503 is organized in a manner such that a reader (of a playback device) 402 (shown in FIG. 4) or other playback application of a playback device may just interpret 505 (shown in FIG. 5) the header 315 and/or tags 316-321, access 502 the appropriate corresponding media that is texturized and present/execute 506 the media presentation 510 in a playback application according to the instructions of the header 315 and/or tags 316-321. The playback application may be a standalone or a web-based application. In some embodiments, the tags 316 (or, dictionary 317) may identify the media source, the scene/slide to which the media corresponds, and an event timeline 320 of how to integrate the scene/slide into the overall media presentation in view of the ordering of the scenes in the navigator of scenes tag 319. In some embodiments, the event timeline may arrange the scenes/slides in first-in-first-out (FIFO) order such that the scene/slide that appears first in the event timeline is known to be the first scene/slide that should be displayed by the reader 402 in its active content window 401. Other available information regarding the scene/slide may be available in the event timeline tag 320 and may, for example, include the initial state (e.g., active/inactive), position, and/or texture of the media with respect to the scene/slide. In some embodiments, the event animation tags 321 may provide information to the reader 501 and, particularly, to the interpreter module/engine (of playback device) 505 and execution module/engine 506 such as, for example, the x-y-z position of media on a scene/slide, the z-order of objects, and/or the start/end time for media. The execution module/engine 506 receives the interpreted instructions from the interpreter module engine (of playback device), which parses the structured file 503 and interprets the parsed content, and instructs the reader (of playback device) to show/play the media presentation 510 in a playback application. In some embodiments, the interpreter module/engine (of playback device) 505 may interpret the parsed content of the structured file 503 according to one or more preset preferences of the playback device. The instructions of the execution module/engine 506 may be customized to one or more characteristics associated with the playback device on which the reader 501 is being executed. In some embodiments, such characteristics may include the operating system, the memory capacity, the display device type, the graphics capability, the playback application type, the communications rate available, the communications protocol available, the content control setting, the autoplay setting, the audio capability, the volume setting, and/or the user input capability (e.g., mouse, touchpad, keyboard, or other input device).

Figure 4:
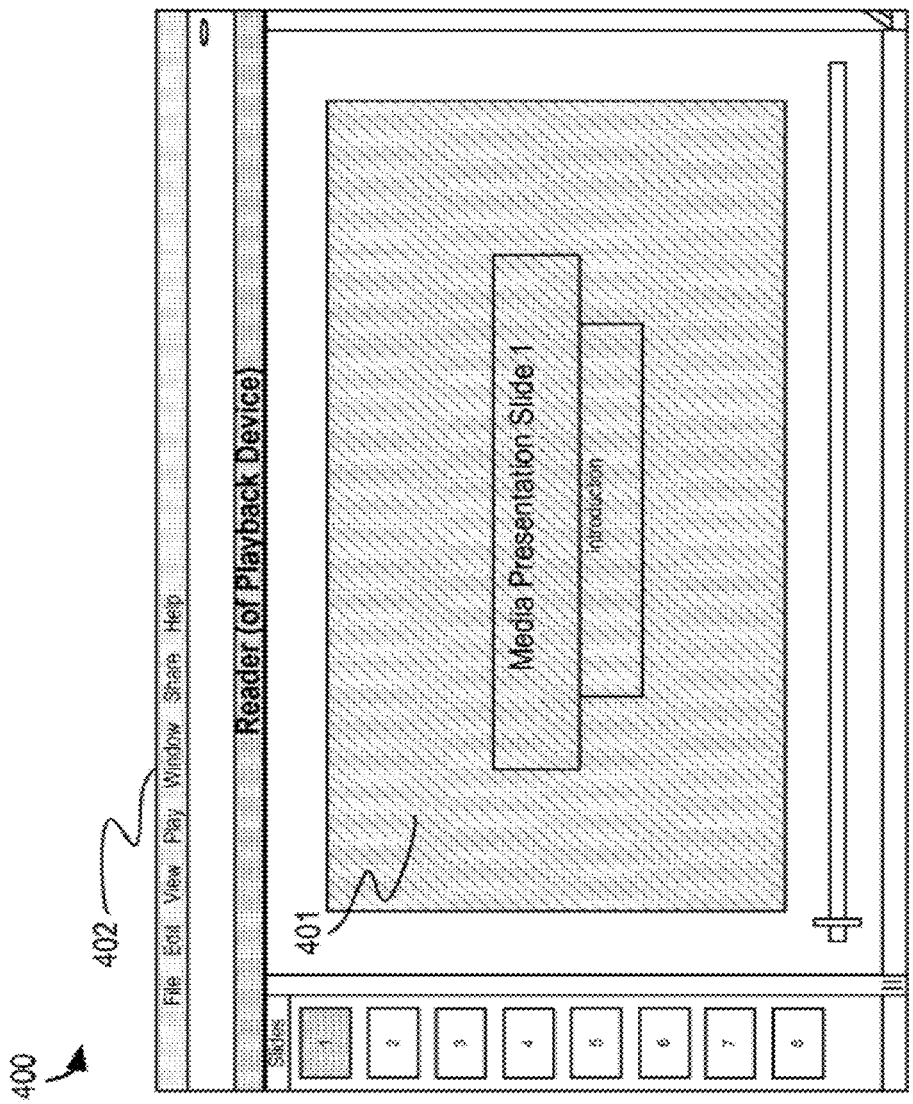
FIG. 4 illustrates an exemplary embodiment of a reader (of playback device) application in accordance with the present invention.

FIG. 4 illustrates an exemplary embodiment 400 of a reader (of playback device) application 402 in accordance with the present invention.

Figure 5:
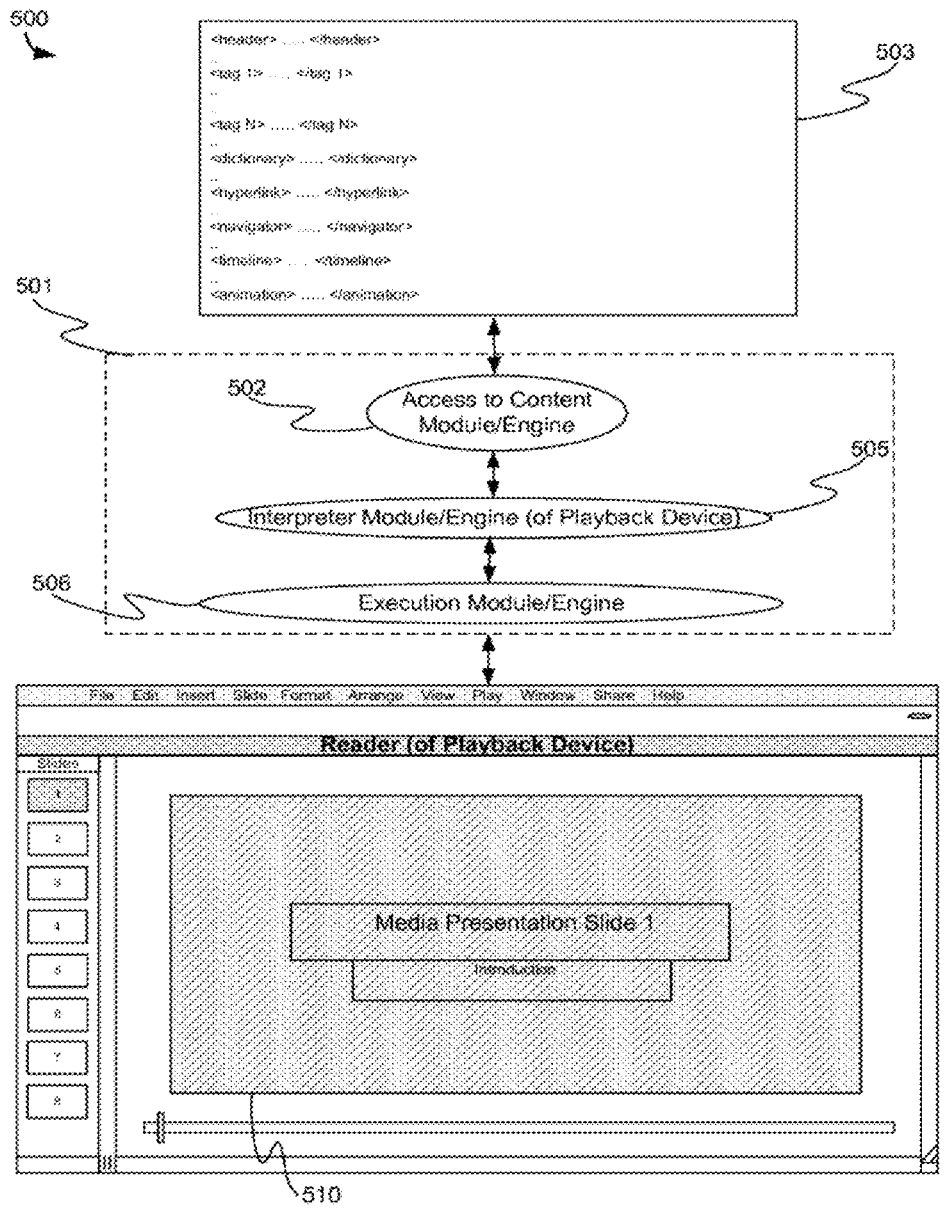
FIG. 5 illustrates an exemplary system block diagram of a reader (of playback device) application interpreting a structured file in accordance with the present invention.

FIG. 5 illustrates an exemplary system block diagram 500 of a reader (of playback device) application 501 interpreting a structured file 503 in accordance with the present invention.

Figure 6:
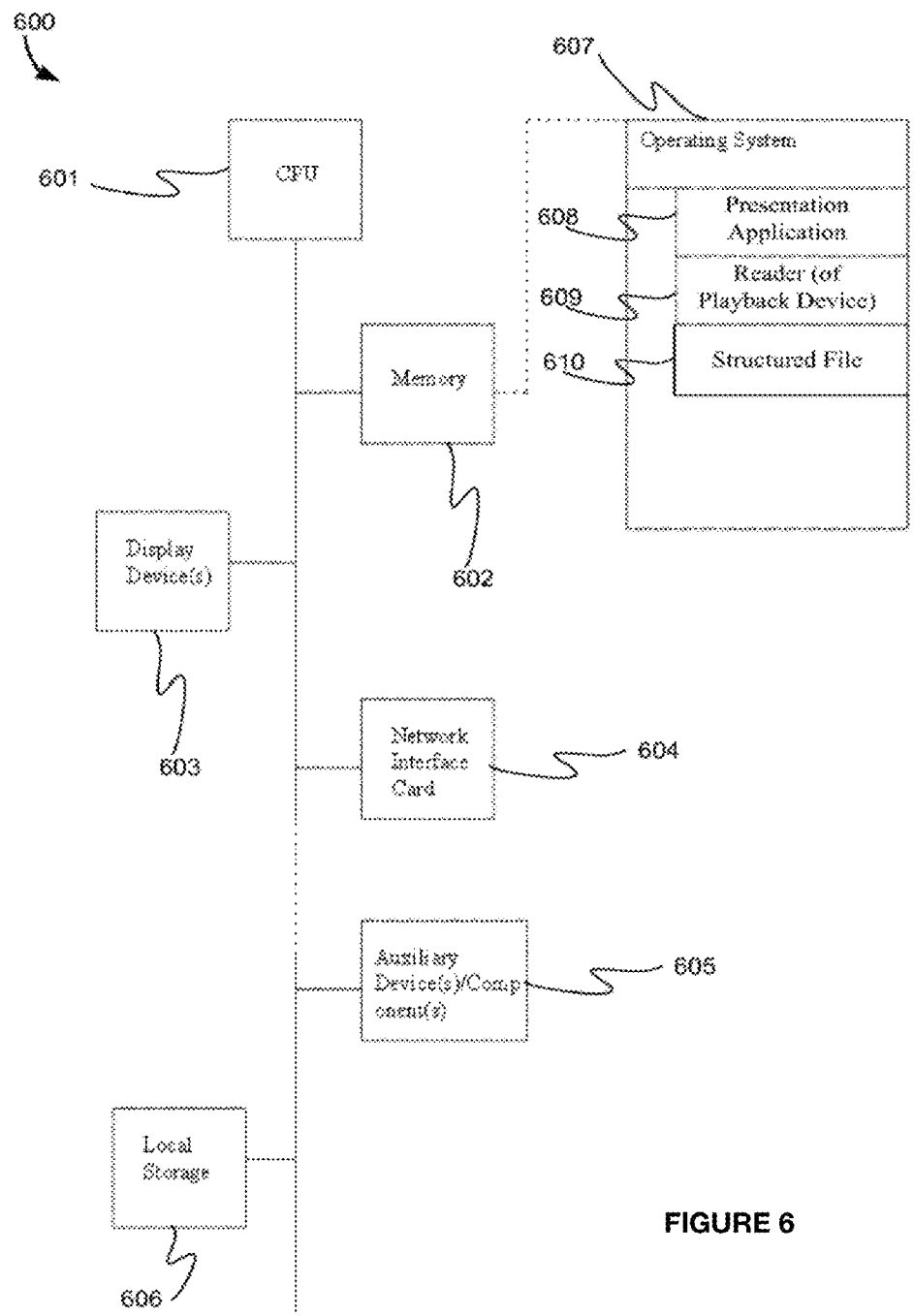
FIG. 6 illustrates an exemplary system block diagram of a system executing a presentation application and/or a reader (of playback device) application in accordance with the present invention.

FIG. 6 illustrates an exemplary system block diagram of a system 600 executing the presentation application 608 and/or the reader (of playback device) application 609 in accordance with the present invention. The system may include a computer processing unit (CPU) 601, memory 602 (e.g., volatile or non-volatile), display device(s) 603, network interface card (NIC) 604, an interface for auxiliary device(s)/component(s) 605, and local storage 606 (e.g., non-volatile). An operating system 607 may reside in local storage 606, remotely on a network accessible by the NIC 604, and/or memory 602. Instructions being executed by the CPU 601 may be fetched from memory 602 and may include instructions from one or more modules of the presentation application 608, the reader (of playback devices) 609, and/or one or more other applications. The structured file 610 may reside in local storage 606, memory 602, and/or on a network accessible by the NIC 604. The system 600 may be a handheld device, laptop computer, desktop computer, server, or some other system capable of housing the components 601-606.

Figure 7:
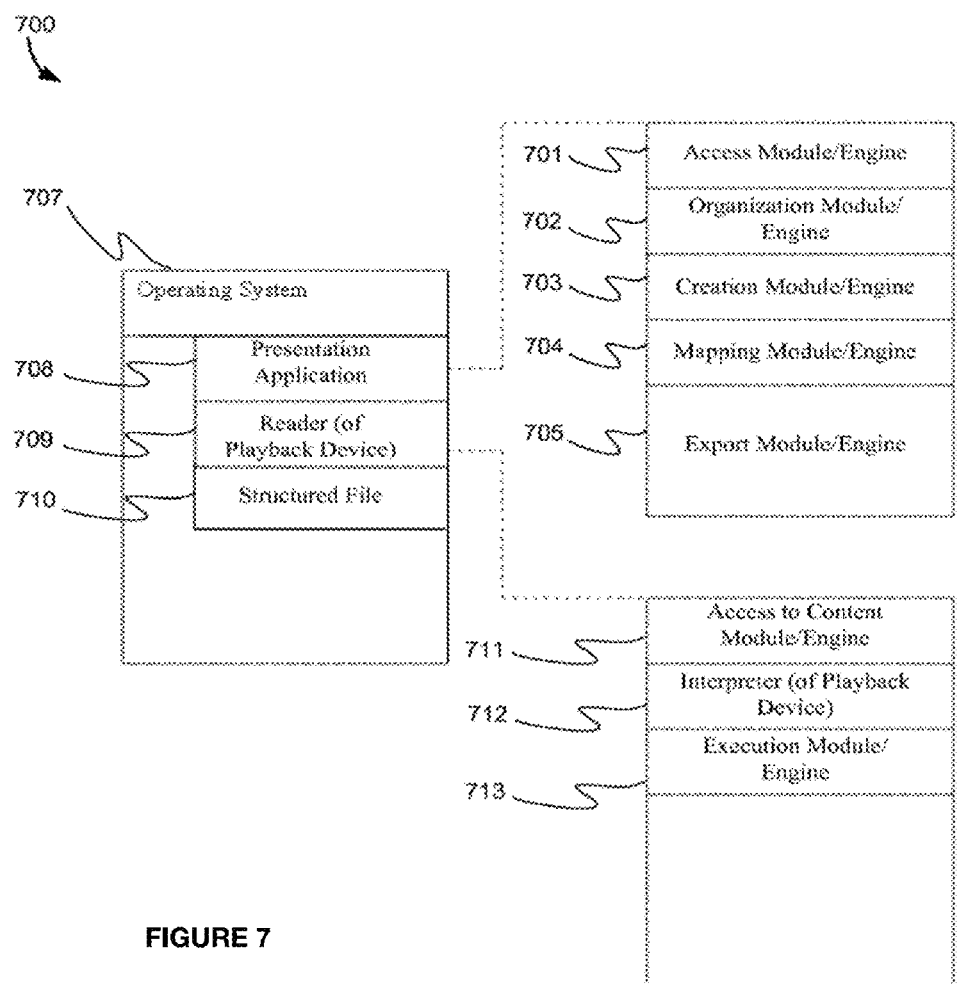
FIG. 7 illustrates an exemplary module block diagram of the execution of the modules/engines of a presentation application and/or a reader (of playback device) application in accordance with the present invention.

FIG. 7 illustrates an exemplary module block diagram of the execution of the modules/engines 700 of the presentation application 708 and/or the reader (of playback device) application 709 in accordance with the present invention. The presentation application 708 and/or the reader (of playback device) application 709 may be executed via an operating system 707 responsible for managing the system on which it is stored or configured to manage. The presentation application 708 may include one or more modules/engines for executing the instructions corresponding to the media presentation application 101, 201, 304. The modules may include an access module/engine 701, organization module/engine 702, creation module/engine 703, mapping module/engine 704, and export module/engine 705. The reader (of playback device) application 709 may include one or more modules for executing the instructions corresponding to the reader 402, 501. The modules may include an access to content module/engine 711, an interpreter (of playback device) 712, and an execution module/engine 713.

Figure 8:
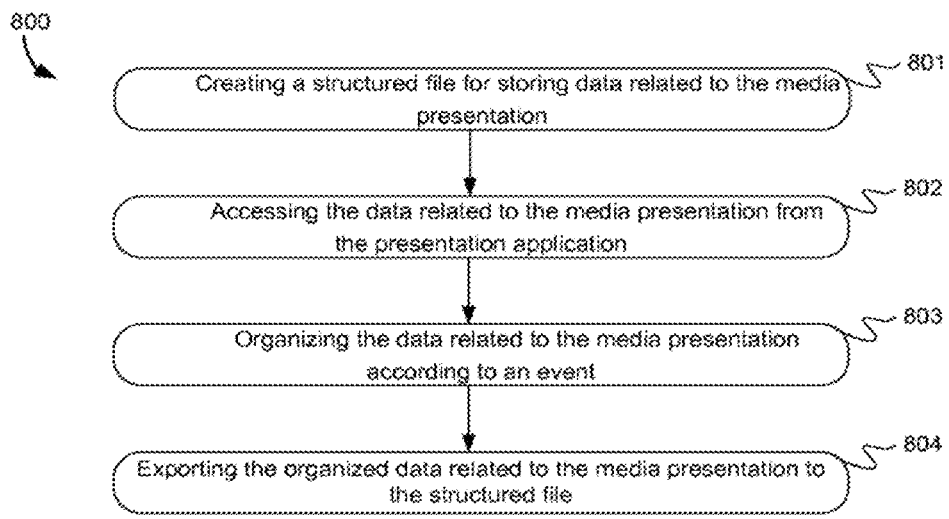
FIG. 8 illustrates exemplary method steps of a presentation application in accordance with the present invention.

FIG. 8 illustrates exemplary method steps 800 of a presentation application in accordance with the present invention. The computer-implemented method steps are for exporting a media presentation from a presentation application by creating a structured file for storing data related to the media presentation 801, accessing the data related to the media presentation from the presentation application 802, organizing the data related to the media presentation according to an event 803, and exporting the organized data related to the media presentation to the structured file 804.

Figure 9:
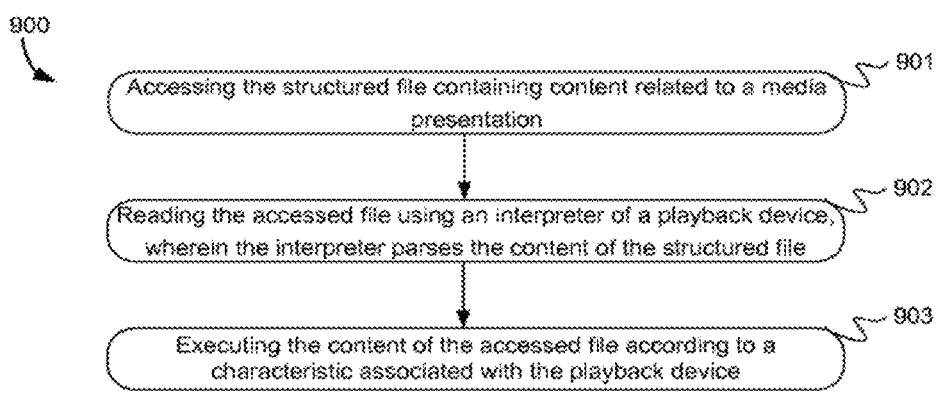
FIG. 9 illustrates exemplary method steps of a reader (of playback device) application in accordance with the present invention.

FIG. 9 illustrates exemplary method steps 900 of a reader (of playback device) application in accordance with the present invention. The computer-implemented method steps are for reading a structured file containing data related to a media presentation by accessing the structured file containing content related to a media presentation 901, reading the accessed file using an interpreter of a playback device, wherein the interpreter parses the content of the structured file 902, and executing the content of the accessed file according to a characteristic associated with the playback device 903.

Figure 10:
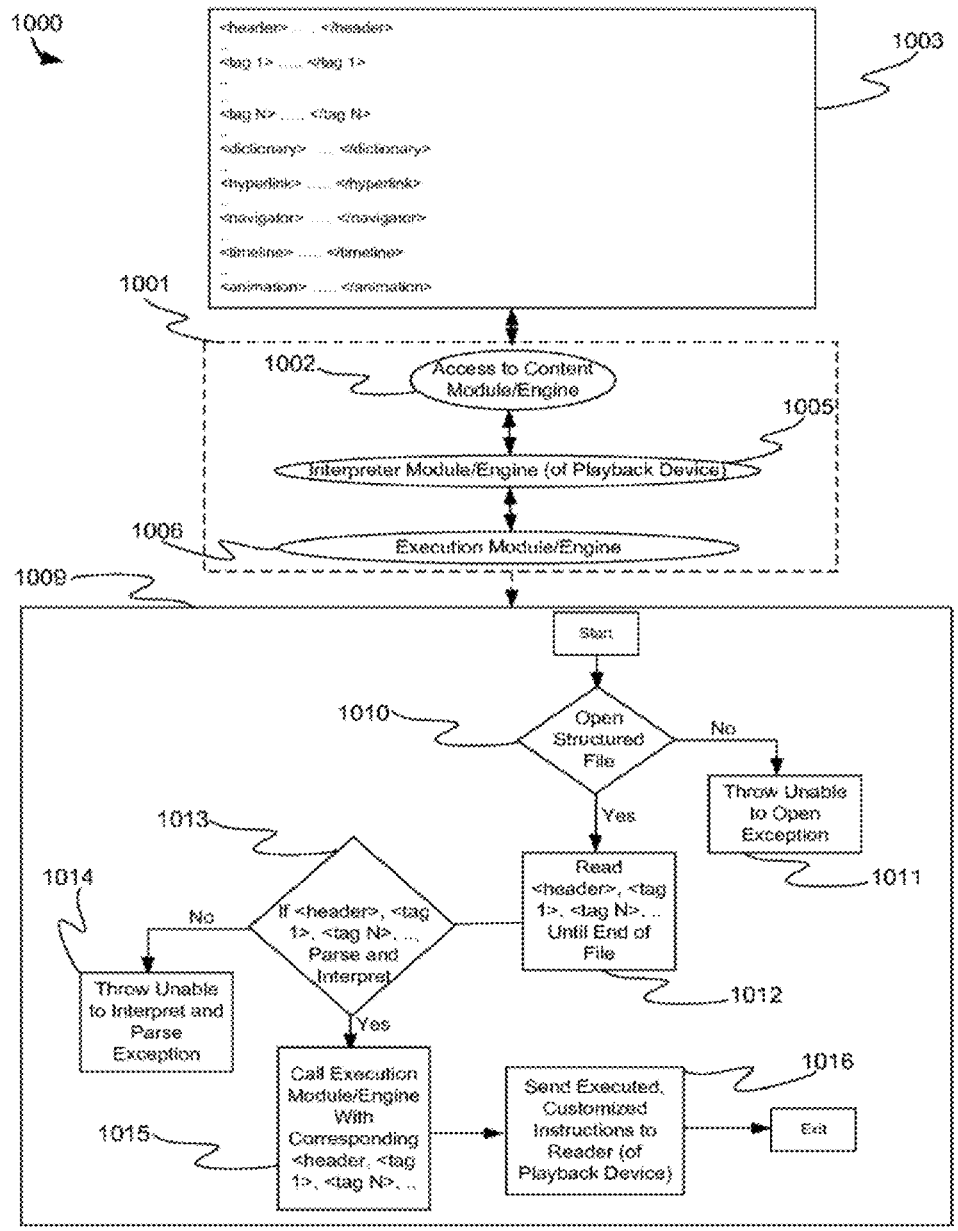
FIG. 10 illustrates an exemplary process flow of a reader (of playback device) interpreting a structured file and presenting a media presentation in accordance with the present invention.

FIG. 10 illustrates an exemplary process flow diagram of a reader (of playback device) 1001 interpreting a structured file 1003 and presenting a media presentation in accordance with the present invention. The reader (of playback device) 1001 application includes an access to content module/engine 1002, an interpreter module/engine (of playback device) 1005, and an execution module/engine 1006. The steps of the process flow 1009 of the implementation of the reader 1001 include the access to content module/engine 1002 first opening the structured file 1010. If the opening of the structured file 1010 is not performed successfully, an exception is thrown indicating that the access to content module/engine 1002 was unable to open the structured file 1011. In some embodiments, a reader (of playback device) 1001 exception handler (not shown) that is listening for exceptions may catch the thrown exception, process the exception, and output an appropriate message via the reader 1001, which may return to normal execution and/or prompt the user with one or more options (e.g., attempt to re-open file, attempt to open a new file, cancel the process). If the opening of the structured file 1010 is performed successfully, the interpreter module/engine (of playback device) 1005 may read the header and all tags until the end of the file 1012 is reached. As the interpreter 1005 reads the contents of the structured file 1012, it parses the contents and determines 1013 whether a header is present, which tags are present, and may interpret and store the header and tags into one or more data structures (e.g., stack, queue, or the like) for later access by one or more subroutines/modules (not shown). Each such subroutine/module may then call the execution module/engine 1006 for processing 1015 the header and tags according to the data associated with the header and tags. Such processing by the execution module/engine may be executed according to characteristics (discussed above) of the playback device on which the reader 1001 is executing. If the interpreter 1005 is not able to parse the contents or determine whether a header or tags are present, then the interpreter 1005 may throw an unable to interpret and parse exception 1014 for handling by the handler (not shown) that is listening for exceptions. The handler may catch the thrown exception, process the exception, and output an appropriate message via the reader 1001, which may return to normal execution and/or prompt the user with one or more options (e.g., attempt to re-open file, attempt to open a new file, cancel the process).

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

The invention claimed is:

1. A computer-implemented method, comprising:
   creating, in a memory, a structured file for storing first and second portions of data related to a media presentation, wherein each portion of data comprises one or more media items;
   accessing the first and second portions of data related to the media presentation;
   organizing the data related to the media presentation according to an event;
   converting each of the one or more media items in the first portion of data from an original type to a converted type to generate a third portion of data comprising each of the one or more converted media items; and
   exporting the second and third portions of data to the structured file in accordance with the organized data related to the media presentation,
   wherein the structured file comprises tags for mapping between an identity of exported media items and use of those media items in the media presentation.

2. The method of claim 1, wherein converting comprises converting an image having a first format to an image having a second format.

3. The method of claim 1, wherein the media presentation comprises a plurality of scenes, and the tags further comprise a time-ordered list of the plurality of scenes.

4. The method of claim 3, wherein the time-ordered list of the plurality of scenes further comprises an initial state of a media item that corresponds to a beginning of the media presentation.

5. A non-transitory program storage device comprising instructions stored thereon to cause one or more processors to:
   create, in a memory, a structured file for storing first and second portions of data related to a media presentation, wherein each portion of data comprises one or more media items;
   access the first and second portions of data related to the media presentation;
   organize the data related to the media presentation according to an event;
   convert each of the one or more media items in the first portion of data from an original type to a converted type to generate a third portion of data comprising each of the one or more converted media items; and
   export the second and third portions of data to the structured file in accordance with the organized data related to the media presentation,
   wherein the structured file comprises tags for mapping between an identity of exported media items and use of those media items in the media presentation.

6. The non-transitory program storage device of claim 5, wherein the instructions to cause the one or more processors to convert comprise instructions to cause the one or more processors to convert an image having a first format to an image having a second format, wherein the first and second formats are different.

7. The method of claim 5, wherein the media presentation comprises a plurality of scenes, and the tags further comprise a time-ordered list of the plurality of scenes.

8. The non-transitory program storage device of claim 7, wherein the time-ordered list of the plurality of scenes further comprises an initial state of a media item that corresponds to a beginning of the media presentation.

9. A computer-implemented method, comprising:
   accessing a structured file containing all media items related to a media presentation, wherein at least one of the media items comprises a textured media item;
   reading, by an interpreter of a playback device, tags associated with the media items related to the media presentation, wherein the tags are for mapping between each of one or more of the media items and for use of each of the one or more media items during playback of the media presentation; and
   playing, by the playback device, a time-ordered sequence of media items related to the media presentation in accordance with the structured file,
   wherein playing includes presenting the at least one textured media item in accordance with a characteristic of the playback device.

10. The method of claim 9, wherein the media presentation comprises a plurality of scenes, and the tags further comprise a time-ordered list of the plurality of scenes.

11. The method of claim 10, wherein the time-ordered list of the plurality of scenes further comprises an initial state of a media item that corresponds to a beginning of the media presentation.

12. The method of claim 10, wherein playing comprises parsing the structured file in accordance with the time-ordered list of the plurality of scenes.

13. The method of claim 12, wherein playing further comprises causing one or more media items from the structured file to be displayed.

14. The method of claim 12, wherein the interpreter interprets the parsed content of the structured file according to a preset preference of the playback device.

15. The method of claim 9, wherein the characteristic of the playback device comprises one or more of: an operating system, a memory capacity, a display device type, a graphics capability, a playback application type, a communications rate, a communications protocol, a content control setting, an auto-play setting, an audio capability, a volume setting, and a user input capability.

16. A non-transitory program storage device comprising instructions stored thereon to cause one or more processors to:
    access a structured file containing all media items related to a media presentation, wherein at least one of the media items comprises a textured media item;
    read, by an interpreter of a playback device, tags associated with the media items related to the media presentation, wherein the tags are for mapping between each of one or more of the media items and for use of each of the one or more media items during playback of the media presentation; and
    play, by the playback device, a time-ordered sequence of media items related to the media presentation in accordance with the structured file,
    wherein playing includes presenting the at least one textured media item in accordance with a characteristic of the playback device.

17. The non-transitory program storage device of claim 16, wherein the media presentation comprises a plurality of scenes, and the tags further comprise a time-ordered list of the plurality of scenes.

18. The non-transitory program storage device of claim 17, wherein the time-ordered list of the plurality of scenes further comprises an initial state of a media item that corresponds to a beginning of the media presentation.

19. The non-transitory program storage device of claim 17, wherein the instructions to cause the one or more processors to play comprise instructions to cause the one or more processors to parse the structured file in accordance with the time-ordered list of the plurality of scenes.

20. The non-transitory program storage device of claim 19, wherein the instructions to cause the one or more processors to play further comprise instructions to cause the one or more processors to cause one or more media items from the structured file to be displayed.

21. The non-transitory program storage device of claim 19, wherein the instructions to cause the one or more processors to play further comprise instructions to cause the one or more processors to cause one or more media items from the structured file to generate sound.

22. The non-transitory program storage device of claim 19, wherein the interpreter interprets the parsed content of the structured file according to a preset preference of the playback device.

23. The non-transitory program storage device of claim 16, wherein the characteristic of the playback device comprises one or more of: an operating system, a memory capacity, a display device type, a graphics capability, a playback application type, a communications rate, a communications protocol, a content control setting, an auto-play setting, an audio capability, a volume setting, and a user input capability.

* * * * *